United States Patent
Chou et al.

(10) Patent No.: US 11,546,907 B2
(45) Date of Patent: Jan. 3, 2023

(54) OPTIMIZATION OF 5G (FIFTH GENERATION) BEAM COVERAGE AND CAPACITY AND NSI (NETWORK SLICE INSTANCE) RESOURCE ALLOCATION

(71) Applicant: Intel Corporation, Santa Clara, CA (US)

(72) Inventors: Joey Chou, Scottsdale, AZ (US); Yizhi Yao, Chandler, AZ (US); Alexander Sirotkin, Hod Hasharon (IL); Youn Hyoung Heo, San Jose, CA (US); Alexandre Saso Stojanovski, Paris (FR); Yi Guo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 16/973,402

(22) PCT Filed: Oct. 30, 2019

(86) PCT No.: PCT/US2019/058834
§ 371 (c)(1),
(2) Date: Dec. 8, 2020

(87) PCT Pub. No.: WO2020/092541
PCT Pub. Date: May 7, 2020

(65) Prior Publication Data
US 2021/0258941 A1 Aug. 19, 2021

Related U.S. Application Data

(60) Provisional application No. 62/753,829, filed on Oct. 31, 2018.

(51) Int. Cl.
*H04W 4/00* (2018.01)
*H04W 72/04* (2009.01)
(Continued)

(52) U.S. Cl.
CPC ....... *H04W 72/046* (2013.01); *H04W 72/085* (2013.01); *H04W 84/18* (2013.01)

(58) Field of Classification Search
CPC . H04W 72/046; H04W 72/085; H04W 84/18; H04W 24/02; H04W 16/28; H04B 7/0617
See application file for complete search history.

(56) References Cited

U.S. PATENT DOCUMENTS

2011/0009105 A1* 1/2011 Lee ............... H04B 7/0695
455/418
2013/0090126 A1 4/2013 Xing et al.
(Continued)

OTHER PUBLICATIONS

International Patent Office—International Search Report and Written Opinion dated May 8, 2020 from International Application No. PCT/US2019/058834, 10 pages.
(Continued)

*Primary Examiner* — Chuong T Ho
(74) *Attorney, Agent, or Firm* — Schwabe, Williamson & Wyatt, P.C.

(57) ABSTRACT

Techniques discussed herein can facilitate SON (Self Organizing Network) functions for 5G (Fifth Generation) NR (New Radio) systems. One example embodiment comprises an apparatus configured to be employed in a SON (Self Organizing Network) function, comprising: a memory interface; and processing circuitry configured to: collect one or more performance measurements associated with at least one of a RAN (Radio Access Network) or CN (Core Network); analyze the one or more performance measurements; and generate one or more actions to control the behavior of at least one of the RAN or the CN, based on the analyzing of the one or more performance measurements.

19 Claims, 5 Drawing Sheets

(51) Int. Cl.
*H04W 72/08* (2009.01)
*H04W 84/18* (2009.01)

(56) References Cited

U.S. PATENT DOCUMENTS

| | | | | |
|---|---|---|---|---|
| 2018/0139106 | A1* | 5/2018 | Senarath | H04L 41/145 |
| 2018/0288755 | A1* | 10/2018 | Liu | H04L 5/005 |
| 2020/0236559 | A1* | 7/2020 | Spiotta | H04W 64/003 |
| 2021/0168643 | A1* | 6/2021 | Yao | H04W 8/02 |
| 2021/0204148 | A1* | 7/2021 | Chou | H04W 24/02 |
| 2021/0360459 | A1* | 11/2021 | Zhang | H04W 24/10 |
| 2021/0376902 | A1* | 12/2021 | Burström | H04W 24/08 |

OTHER PUBLICATIONS

Intel, "pCR 28.861 add SON overview," 3GPP TSG SA WG5 (Telecom Management) Meeting #121, S5-186232, Agenda Item: 6.6.8, Oct. 8-12, 2018, Kochi, India, 2 pages.
Intel, "pCR 28.861 add SON frameworks," 3GPP TSG SA WG5 (Telecom Management) Meeting #121, S5-186233, Agenda Item: 6.6.8, Oct. 8-12, 2018, Kochi, India, 2 pages.
Intel, "New SID on Self-Organizing Networks (SON) for 5G networks," 3GPP TSG|WG-5 Meeting #120, S5-185592, Agenda Item: 6.2, Aug. 20-24, 2018, Belgrade, Serbia, 3 pages.
Intel, Verizon, "pCR 28.861 add use case for RAN condition data," 3GPP TSG SA WG5 (Telecom Management) Meeting #121, S5-186267, Agenda Item: 6.6.8, Oct. 8-12, 2018, Kochi, India, 2 pages.

* cited by examiner

OPTIMIZATION OF 5G (FIFTH GENERATION) BEAM COVERAGE AND CAPACITY AND NSI (NETWORK SLICE INSTANCE) RESOURCE ALLOCATION

REFERENCE TO RELATED APPLICATIONS

This application is a national phase entry under 35 U.S.C. § 371 of International Application No. PCT/US2019/058834, filed Oct. 30, 2019, entitled "OPTIMIZATION OF 5G (FIFTH GENERATION) BEAM COVERAGE AND CAPACITY AND NSI (NETWORK SLICE INSTANCE) RESOURCE ALLOCATION," which claims priority under 35 U.S.C. 119(e) to U.S. Provisional Patent Application No. 62/753,829 filed Oct. 31, 2018, entitled "TECHNOLOGIES FOR OPTIMIZATION OF 5G BEAM COVERAGE AND CAPACITY AND NSI RESOURCE ALLOCATION", the entire disclosures of which are hereby incorporated by reference.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Embodiments described herein can be implemented into a system using any suitably configured hardware and/or software. In various aspects, embodiments discussed herein can employ AI to analyze the historical performance measurements collected over the days, weeks, and beyond to facilitate SON (Self Organizing Network) functions for 5G (Fifth Generation) NR (New Radio) systems.

Figure 1:
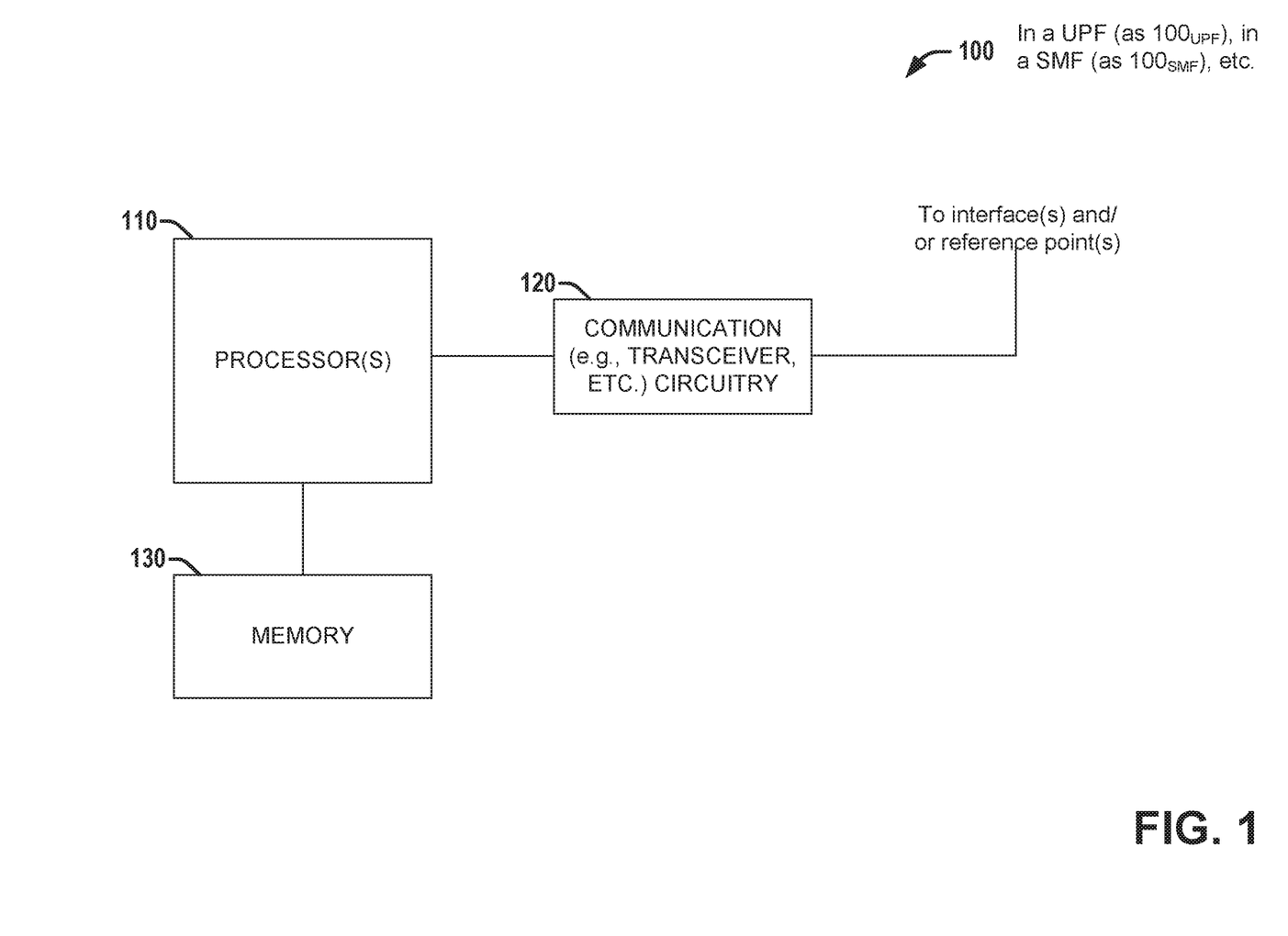
FIG. 1 is a block diagram illustrating a system that facilitates automation of SON (Self Organizing Network) functions for 5G (Fifth Generation) NR (New Radio) systems, in accordance with various embodiments discussed herein.

Referring to FIG. 1, illustrated is a block diagram of a system 100 employable at a SON (Self Organizing Network) function of a 3GPP (Third Generation Partnership Project) management system that facilitates automation of SON functions, in embodiments. System 100 can include processor(s) 110 comprising processing circuitry and associated interface(s) (e.g., a communication interface for communicating with communication circuitry 120, a memory interface for communicating with memory 130, etc.), communication circuitry 120 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 130 (which can comprise any of a variety of storage mediums and can store instructions and/or data associated with one or more of processor(s) 110 or transceiver circuitry 120). Specific types of embodiments (e.g., UE embodiments) can be indicated via subscripts (e.g., system $100_{UE}$ comprising processor(s) $110_{UE}$, communication circuitry $120_{UE}$, and memory $130_{UE}$). In BS embodiments (e.g., system $100_{gNB}$) and network component (e.g., UPF (User Plane Function), etc.) embodiments (e.g., system $100_{UPF}$) processor(s) $110_{gNB}$ (etc.), communication circuitry $120_{gNB}$ (etc.), and memory $130_{gNB}$ (etc.) can be in a single device or can be included in different devices, such as part of a distributed architecture. In embodiments, signaling or messaging between different embodiments of system 100 (e.g., $100_1$ and $100_2$) can be generated by processor(s) $110_1$, transmitted by communication circuitry $120_1$ over a suitable interface or reference point (e.g., N4, etc.), received by communication circuitry $120_2$, and processed by processor(s) $110_2$.

5G (Fifth Generation) networks feature eMBB (enhanced Mobile Broadband), URLLC (Ultra Reliable Low Latency Communications), and mMTC (massive Machine Type Communications) that are characterized by high speed high data volume, low speed ultra-low latency, and infrequent transmitting low data volume from huge number of emerging smart devices, respectively. To support the wide range of QoS (Quality of Service) levels, automatic tuning of 5G networks can facilitate responding to the network situation in order to maintain the optimal performance efficiency. Since 5G networks will have many more cells than previous generations of cellular networks, SON (Self-Organizing Network) automation is even more important for operators to manage the complicated 5G networks than for earlier RATs (Radio Access Technologies).

Various embodiments can employ techniques discussed herein to any of several 5G SON use cases, such as beam coverage and capacity optimization, and/or resource optimization for NSI(s) (Network Slice Instance(s)) supporting eMBB, URLLC, and mMTC to optimize the RAN performance and efficiency. Various embodiments can use AI (Artificial Intelligence) to analyze historical performance measurements collected over days, weeks, and beyond to determine actions that can optimize the performance of a 5G SON in various scenarios, such as: (1) Beam coverage and capacity and/or (2) Resource optimization for NSIs supporting eMBB, URLLC, and mMTC.

Various embodiments have multiple advantages over existing techniques. For example, embodiments can employ AI techniques discussed herein to facilitate 5G SON automatically adjusting resource allocations for NSIs) according to demand, which can help operators improve network efficiency and reduce cost, via reduced CAPEX (capital expenditure), etc. Additionally, 5G SON facilitated by various embodiments discussed herein can optimize the coverage and capacity of beams of neighboring cells, which can improve user experience.

Figure 2:
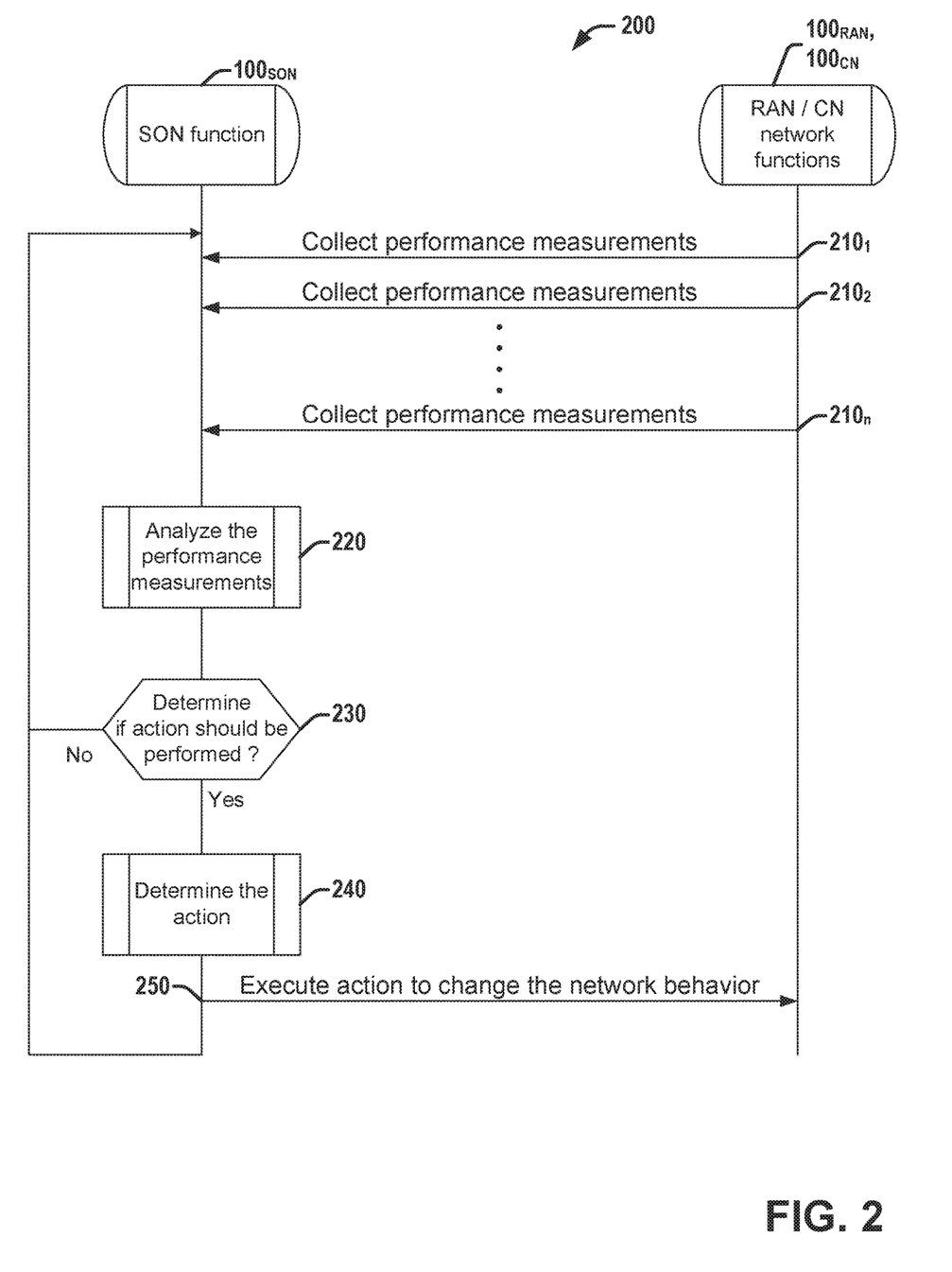
FIG. 2 is a flow diagram illustrating an example method employable by a SON function that facilitates changes in behavior of a RAN or CN, according to various aspects discussed herein.

Referring to FIG. 2, illustrated is a flow diagram of an example method 200 employable by a SON function (e.g., comprising system $100_{SON}$) that facilitates changes in behavior (e.g., adjusting allocation of NSI(s), coverage or capacity of beams, etc.) of a RAN or CN (e.g., comprising one or more RAN or CN functions, e.g., as indicated via systems $100_{RAN}$ and $100_{CN}$), according to various aspects discussed herein. In other aspects, a machine-readable medium can store instructions associated with method 200 that, when executed, can cause a SON function to perform the acts of method 200.

At $210_1$-$210_n$, a SON function can collect (e.g., via processor(s) $110_{SON}$ and/or communication circuitry $120_{SON}$) performance measurements from one or more RAN and/or CN functions (e.g., performance measurements generated by processor(s) $110_{RAN}$ and/or $110_{CN}$, and sent by communication circuitry $120_{RAN}$ and/or $120_{CN}$, respectively, of system(s) $100_{RAN}$/$100_{CN}$ employed by one or more RAN/CN functions, respectively).

At 220, the SON function can analyze (e.g., via processor(s) $110_{SON}$) the performance measurements collected at $210_1$-$210_n$.

At 230, the SON function can determine (e.g., via processor(s) $110_{SON}$) whether one or more actions can and/or should be performed to optimize the network (e.g., RAN and/or CN).

At 240, if a determination was made at 230 to perform an action to optimize the RAN and/or CN, the SON function can determine (e.g., via processor(s) $110_{SON}$) what action to perform. Alternatively, if a determination was made at 230 to not perform an action to optimize the RAN and/or CN, method 200 can return to collecting performance measurements at $210_1$-$210_n$.

At 250, the SON function can perform or execute (e.g., via processor(s) $110_{SON}$ and/or communication circuitry $120_{SON}$) the determined action can be performed or executed to change the behavior of the network (e.g., RAN/CN, etc.). After the determined action, method 200 can return to collecting performance measurements at $210_1$-$210_n$.

Additionally or alternatively, method 200 can include one or more other acts described herein in connection with SON functions and/or techniques, according to various aspects.
Example Use Cases and Potential Capabilities or Requirements Various example embodiments discussed herein relate to the following example use cases: (1) Beam coverage and capacity optimization; and (2) Resource optimization for NSIs supporting eMBB, URLLC, mMTC. These two example use cases are discussed below, along with corresponding potential capabilities and/or requirements.

Figure 3:
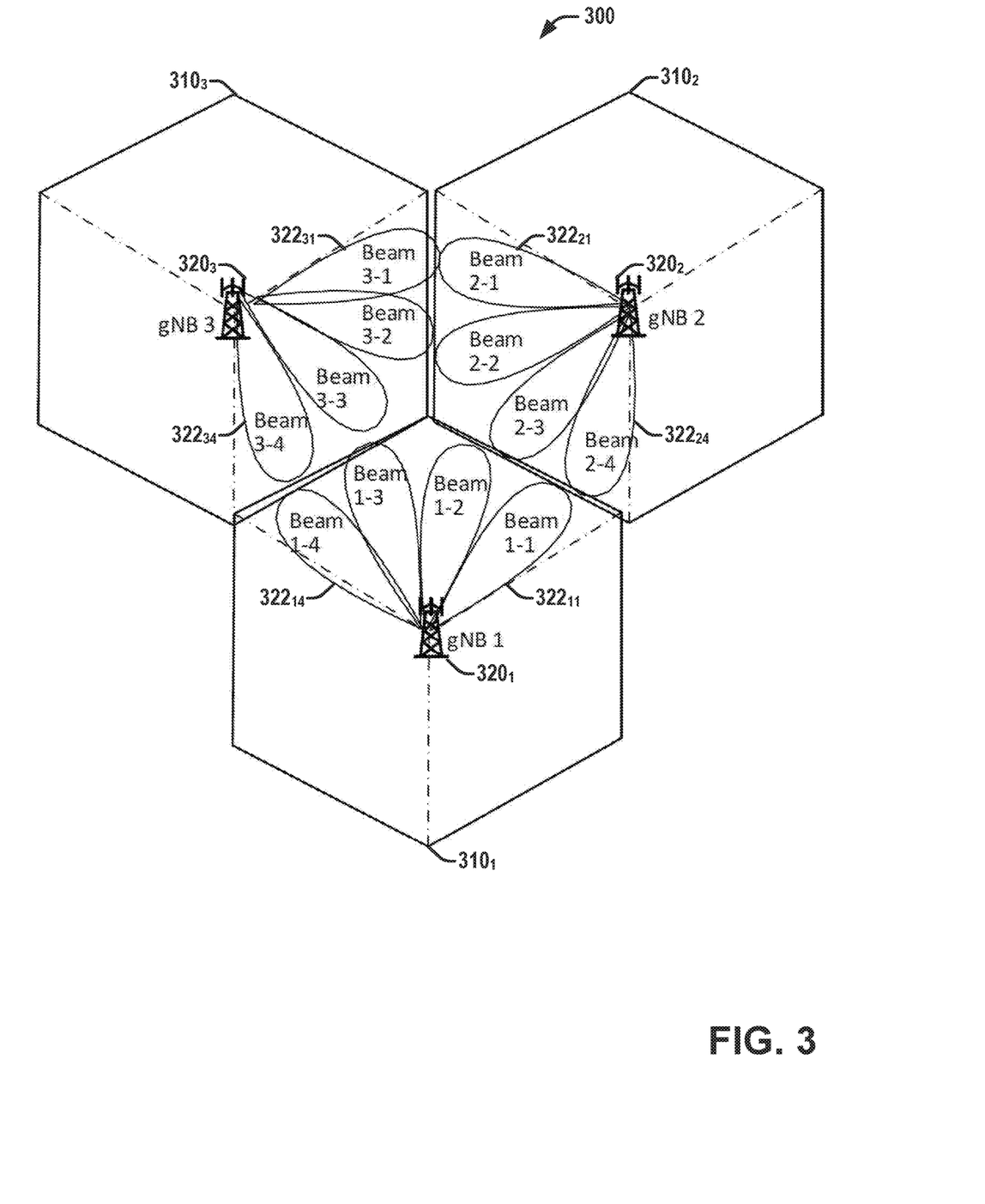
FIG. 3 is a diagram illustrating an example scenario involving multiple NR cells and associated gNBs generating beams, showing a region of poor coverage (e.g., based on one or more metrics being below a threshold level, etc.) between the NR cells $310_i$, in connection with various aspects discussed herein.

Beam Coverage and Capacity Optimization
Beam Coverage and Capacity Optimization: Use Case
Introduction: In LTE, eNB cells transmit signals to cells in fixed direction regardless of the locations of UE in the cell or whether UEs are present or not. In 5G NR, gNB cells transmit many narrow beams targeting UEs in the cell that result in better link budget and lower interference. However, the coverage in areas between beams of neighboring NR cells may be poor, as shown in FIG. 3, illustrating an example scenario 300 involving multiple NR cells $310_i$ and associated gNBs $320_i$ generating beams $322_{ij}$, showing a region of poor coverage (e.g., based on one or more metrics being below a threshold level, etc.) between the NR cells $310_i$, in connection with various aspects discussed herein. Therefore, it can be advantageous to optimize the beam coverage by coordinating the beam management function across multiple neighboring NR cells.

Pre-conditions: 5G NR cells and SON are in operation.
Description: (1) The SON function (e.g., in a 3GPP management system) collects (e.g., via processor(s) $110_{SON}$ and/or communication circuitry $120_{SON}$) the RSRP (RS (Reference Signal) Received Power), RSRQ (RS Received Quality), and SINR (Signal-to-Interference-plus-Noise Ratio) measurements for DL (Downlink) and UL (Uplink) beams in NR cells; (2) The SON function performs (e.g., via processor(s) $110_{SON}$ and/or communication circuitry $120_{SON}$) the following operations, based on the collected measurements: (a) Analyze the RSRP, RSRQ, and SINR measurements of DL and UL beams in neighboring cells; (b) Identify the area that has poor coverage; (c) Determine the actions needed to improve the coverage; and (d) Request one or more gNB(s) to change the coverage of beams in NR cells; and (3) The SON function continues monitoring the performance data of DL and UL beams in NR cells to validate the actions being taken, and may perform additional beam coverage adjustment as appropriate.

Post-conditions: The beam coverage for certain cells are optimized.
Beam Coverage and Capacity Optimization: Potential Capabilities or Requirements REQ-SON CON-x: The SON function (in 3GPP management system) can have a capability to collects the RSRP, RSRQ, and SINR measurements for DL and UL beams in NR cells.

Figure 4:
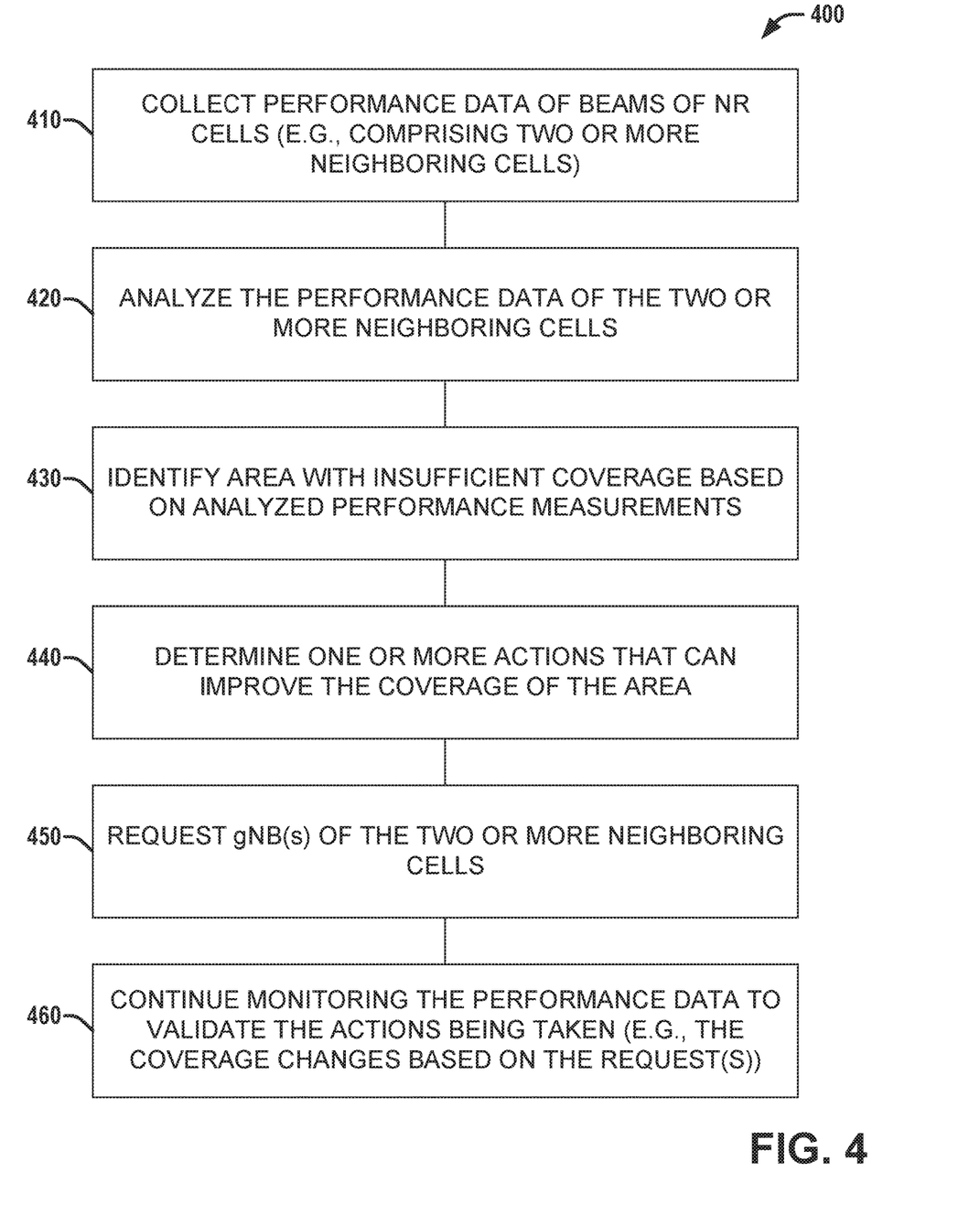
FIG. 4 is a flow diagram illustrating an example method employable at a SON function (e.g., of a 3GPP management system) that facilitates optimization of beam coverage and/or capacity for one or more 5G NR cells, according to various aspects discussed herein.

REQ-SON CON-y: The SON function (in 3GPP management system) can have a capability to request gNB to change the coverage of beams in NR cells.
Beam Coverage and Capacity Optimization: Example Method Referring to FIG. 4, illustrated is a flow diagram of an example method 400 employable at a SON function (e.g., of a 3GPP management system) that facilitates optimization of beam coverage and/or capacity for one or more 5G NR cells, according to various aspects discussed herein. In other aspects, a machine-readable medium can store instructions associated with method 400 that, when executed, can cause a SON function to perform the acts of method 400.

At 410, performance data (e.g., RSRP, RSRQ, SINR, etc.) for beams (e.g., DL and UL) of two or more neighboring NR cells can be collected by a SON function.

At 420, the performance data of the two or more neighboring NR cells can be analyzed.

At 430, based on the analyzed performance measurements, an area that has insufficient coverage (e.g., based on one or more metrics (e.g., RSRP, RSRQ, SINR, etc.) being below a threshold level, etc.) can be identified by the SON function.

At 440, one or more actions can be determined by the SON function that can improve the coverage of the area.

At 450, the SON function can send one or more requests to one or more gNB(s) (Next Generation Node B(s)) to change coverage in connection with the area.

At 460, the SON function can continue monitoring the performance data to validate the actions being taken (e.g., to validate the coverage changes in connection with the area), and can perform additional beam coverage adjustment (e.g., via repeating 410-450) as appropriate.

Additionally or alternatively, method 400 can include one or more other acts described herein in connection with beam coverage and capacity optimization, according to various aspects.

Resource Optimization for NSIs Supporting eMBB, URLLC, and mMTC: Use Case

Introduction: 5G's primary focus is on increasing the speed and capacity of mobile broadband services to meet the fast growing demand of Internet traffic. 5G networks feature eMBB, URLLC, and mMTC services that have different traffic characteristics, ranging from high speed high data volume, low speed ultra-low latency, to infrequently transmitting low data volume. These services may have different usage patterns in terms of time, location, UE distribution and types of applications. For example, IoT (Internet of Things) applications, such as meter reading, may run during off-peak hours or weekends. As another example, special events, such as sport games, concerts, can generate huge Internet traffic demand at certain times and locations (e.g., the New Year's Eve celebration in Time Square).

The eMBB, URLLC, and mMTC are expected to be supported by different NSIs. 5G SON can analyze a huge amount of historical performance data collected over days, weeks, months and beyond to predict the traffic demands of each networks slice, based on times and locations. The demand for eMBB, URLLC, and mMTC services may not come at the same time or the same location. Therefore, based on the analysis, 5G SON can automatically adjust the resource allocations for these NSIs according to demand that will help operators improve network efficiency and reduce cost (e.g., CAPEX, etc.).

Pre-conditions: NSIs for deployed for eMBB, URLLC, and mMTC services, and the SON function are in operation.

Description: (1) The SON function (in 3GPP management system) collects (e.g., via processor(s) $110_{SON}$ and/or communication circuitry $120_{SON}$) the performance data (related to data volume, the number of registered UEs, the number of PDU sessions, etc.) for NSIs supporting the eMBB, URLLC, and mMTC services; The SON function performs (e.g., via processor(s) $110_{SON}$ and/or communication circuitry $120_{SON}$) the following operations, based on the collected performance data: (a) Analyze the historical performance data collected in the past days, weeks, months, and beyond to understand the traffic patterns for the NSIs; (b) Predict the demand for each NSI for a given time and location; and (c) Adjust the resource allocation (e.g. addition, reduction) for the NSIs; and (3) The SON function continues monitoring (e.g., via processor(s) $110_{SON}$ and/or communication circuitry $120_{SON}$) the performance data of eMBB, URLLC, and mMTC NSIs to validate the actions being taken, and may perform additional adjustment as appropriate.

Post-conditions: The resource allocations for the NSIs supporting the eMBB, URLLC, and mMTC services are optimized.

Resource Optimization for NSIs Supporting eMBB, URLLC, and mMTC: Potential Capabilities or Requirements REQ-SON CON-x: The SON function (in 3GPP management system) can have a capability to collect the performance data (including data volume, the number of registered UEs, the number of PDU sessions, etc.) for NSIs supporting eMBB, URLLC, and mMTC network slices.

REQ-SON CON-y: The SON function (in 3GPP management system) can have a capability to adjust the resource allocations for the NSIs supporting the eMBB, URLLC, and mMTC services.

Resource Optimization for NSIs Supporting eMBB, URLLC, and mMTC: Example Method

Figure 5:
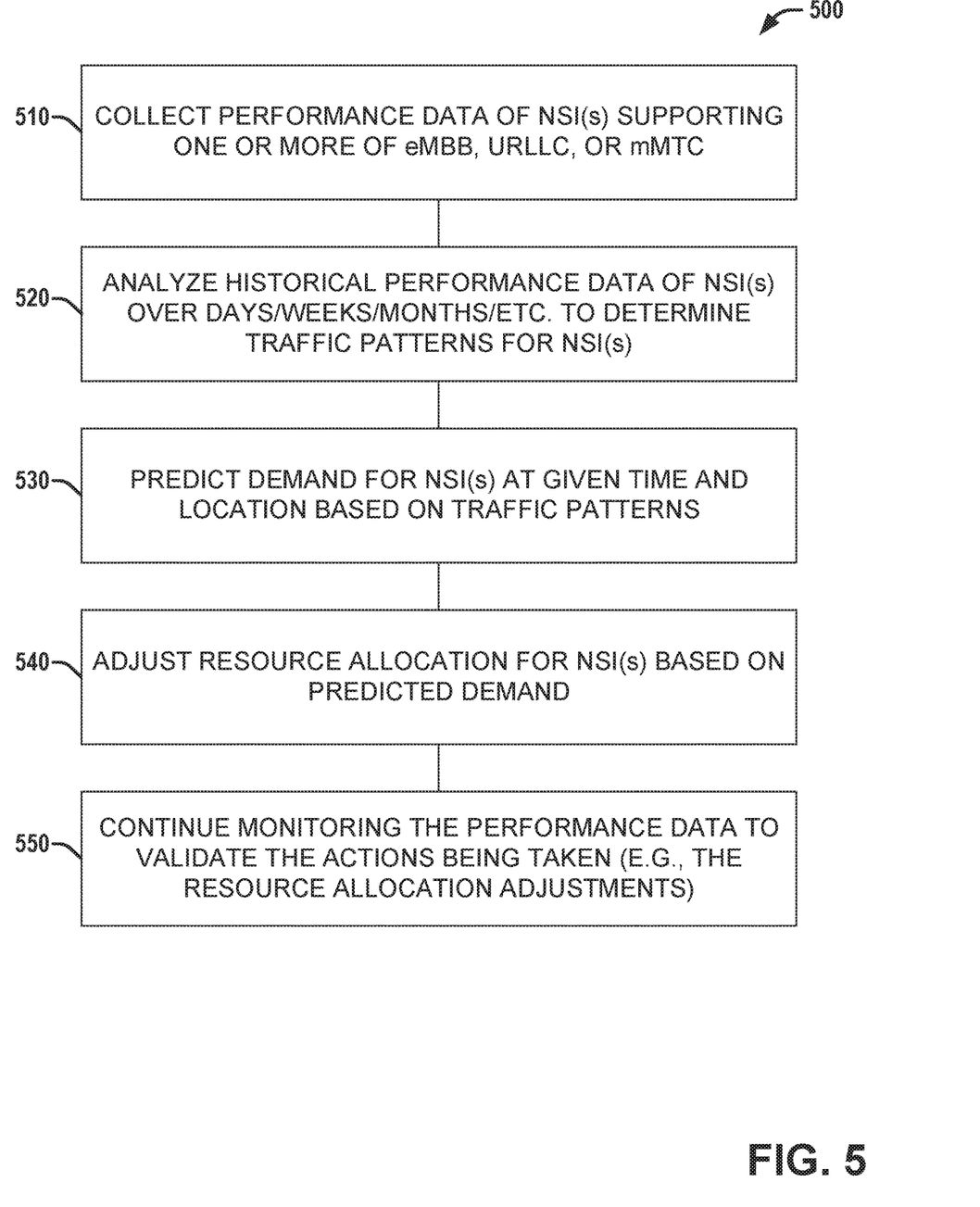
FIG. 5 is a flow diagram illustrating an example method employable at a SON function (e.g., of a 3GPP management system) that facilitates optimization of resource allocations for the NSIs supporting the eMBB, URLLC, and mMTC, according to various aspects discussed herein.

Referring to FIG. 5, illustrated is a flow diagram of an example method 500 employable at a SON function (e.g., of a 3GPP management system) that facilitates optimization of resource allocations for the NSIs supporting the eMBB, URLLC, and mMTC, according to various aspects discussed herein. In other aspects, a machine-readable medium can store instructions associated with method 500 that, when executed, can cause a SON function to perform the acts of method 500.

At 510, performance data (e.g., related to data volume, number of registered UEs (User Equipments), number of PDU (Protocol Data Unit), etc.) for NSIs supporting the eMBB, URLLC, and mMTC services can be collected by a SON function.

At 520, historical performance data of the NSIs can be analyzed over one or more of days, weeks, months, etc. to understand the traffic patterns for the NSIs.

At 530, based on the traffic patterns for the NSIs, the demand for each NSI can be predicted for a given time and a given location.

At 540, the resource allocation can be adjusted (e.g., addition, reduction) for the NSIs.

At 550, the SON function can continue monitoring the performance data of eMBB, URLLC, and eMTC NSIs to validate the actions being taken (e.g., to validate the adjustments to resource allocation of the NSIs), and can perform additional adjustment (e.g., via repeating 510-550) as appropriate.

Additionally or alternatively, method 500 can include one or more other acts described herein in connection with resource allocation optimization for the NSIs supporting the eMBB, URLLC, and mMTC, according to various aspects.

Additional Embodiments

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

A first example embodiment is a SON function supported by one or more processors configured to: collect the performance measurements; analyze the performance measurements; and generate actions to control the RAN or core network behavior.

A second example embodiment is based on the first example embodiment, wherein the SON function is to optimize the beam coverage and capacity.

A third example embodiment is based on any of the first or second example embodiments, wherein the performance measurements are RSRP, RSRQ, and SINR measurements for DL and UL beams in NR cells.

A fourth example embodiment is based on any of the first or second example embodiments, wherein the SON function analyzes the RSRP, RSRQ, and SINR measurements of DL and UL beams in neighboring cells.

A fifth example embodiment is based on any of the first to fourth example embodiments, wherein the SON function identifies the area that has poor coverage, and determines the actions needed to improve the coverage.

A sixth example embodiment is based on any of the first to fifth example embodiments, wherein the SON continues monitoring the performance data of DL and UL beams in NR cells to validate the actions being taken, and may perform additional beam coverage adjustment if necessary.

A seventh example embodiment is based on the first example embodiments, wherein the SON function is configured to optimize the resource for NSIs supporting eMBB, URLLC, mMTC.

An eighth example embodiment is based on any of the first or seventh example embodiments, wherein the performance measurements are performance data (related to data volume, the number of registered UEs, the number of PDU sessions, etc) for NSIs supporting the eMBB, URLLC, and mMTC services.

A ninth example embodiment is based on any of the first, seventh, or eighth example embodiments, wherein the SON function analyzes the historical performance data collected in the past days, weeks, months, and beyond to understand the traffic patterns for the NSIs.

A tenth example embodiment is based on any of the first or seventh to ninth example embodiments, wherein the SON function predicts the demand for each NSI for a given time and location, and adjust the resource allocation (e.g. addition, reduction) for the NSIs at the time and location.

An eleventh example embodiment is based on any of the first or seventh to tenth example embodiments, wherein the SON continues monitoring the performance data of eMBB, URLLC, and mMTC NSIs to validate the actions being taken, and may perform additional adjustment if necessary.

The following are additional example embodiments.

Example 1 is an apparatus configured to be employed in a SON (Self Organizing Network) function, comprising: a memory interface; and processing circuitry configured to: collect one or more performance measurements associated with at least one of a RAN (Radio Access Network) or CN (Core Network); analyze the one or more performance measurements; and generate one or more actions to control the behavior of at least one of the RAN or the CN, based on the analyzing of the one or more performance measurements.

Example 2 comprises the subject matter of any variation of any of example(s) 1, wherein the one or more performance measurements are associated with DL (Downlink) beams and UL (Uplink) beams of two or more neighboring NR (New Radio) cells of the RAN.

Example 3 comprises the subject matter of any variation of any of example(s) 2, wherein the processing circuitry is configured to optimize at least one of a coverage or a capacity of the DL beams and the UL beams, based on the analyzing of the one or more performance measurements.

Example 4 comprises the subject matter of any variation of any of example(s) 2-3, wherein the one or more performance measurements comprise at least one of Reference Signal (RS) Received Power (RSRP) measurements, RS Received Quality (RSRQ) measurements, or Signal-to-Interference-plus-Noise Ratio (SINR) measurements.

Example 5 comprises the subject matter of any variation of any of example(s) 2-4, wherein the processing circuitry is further configured to: identify an area associated with the two or more neighboring NR cells that has poor coverage of at least one of the DL beams or the UL beams, based on the analyzing of the one or more performance measurements; and determine one or more actions to improve the poor coverage of the area.

Example 6 comprises the subject matter of any variation of any of example(s) 1, wherein the one or more performance measurements are associated with NSIs (Network Slice Instances) supporting one or more of eMBB (enhanced Mobile Broadband), URLLC (Ultra Reliable Low Latency Communications), or mMTC (massive Machine Type Communications).

Example 7 comprises the subject matter of any variation of any of example(s) 6, wherein the processing circuitry is configured to optimize resources of the NSIs supporting one or more of eMBB, URLLC, or mMTC.

Example 8 comprises the subject matter of any variation of any of example(s) 6-7, wherein the one or more performance measurements comprise one or more of: a performance measurement related to data volume, a number of registered UEs (User Equipments), or a number of PDU (Protocol Data Unit) sessions.

Example 9 comprises the subject matter of any variation of any of example(s) 6-8, wherein the one or more performance measurements comprise measurements collected over one or more of days, weeks, months, or years.

Example 10 comprises the subject matter of any variation of any of example(s) 6-9, wherein the processing circuitry is further configured to: predict an associated demand for each NSI of the NSIs for a given time and a given location, based on the analyzing of the one or more performance measurements; and adjust a resource allocation for each NSI of the NSIs for the given time and the given location, based on the associated demand predicted for each NSI of the NSIs for the given time and the given location.

Example 11 comprises the subject matter of any variation of any of example(s) 1-10, wherein the processing circuitry is further configured to continue monitoring the one or more performance measurements to validate the one or more actions.

Example 12 comprises the subject matter of any variation of any of example(s) 11, wherein the processing circuitry is further configured to perform one or more further actions based on the continued monitoring.

Example 13 is an apparatus configured to be employed in a SON (Self Organizing Network) function, comprising: a memory interface; and processing circuitry configured to: collect performance measurements for DL (Downlink) beams and UL (Uplink) beams in a set of NR cells; analyze the performance measurements of the DL beams and the UL beams in two or more neighboring cells of the set of NR cells; identify an area associated with the two or more neighboring cells that has poor coverage of at least one of the DL beams or the UL beams, based on the analyzing of the performance measurements; determine one or more actions to improve the poor coverage; and perform the one or more actions to improve the coverage.

Example 14 comprises the subject matter of any variation of any of example(s) 13, wherein the performance measurements comprise one or more of Reference Signal (RS) Received Power (RSRP) measurements, RS Received Quality (RSRQ) measurements, or Signal-to-Interference-plus-Noise Ratio (SINR) measurements.

Example 15 comprises the subject matter of any variation of any of example(s) 13-14, wherein the one or more actions comprise requesting one or more gNBs (next generation Node Bs) to change coverage of at least one of the DL beams or the UL beams in the two or more neighboring cells.

Example 16 comprises the subject matter of any variation of any of example(s) 15, wherein the processing circuitry is further configured to continue monitoring the performance measurements to validate the one or more actions.

Example 17 comprises the subject matter of any variation of any of example(s) 16, wherein the processing circuitry is further configured to perform one or more further actions based on the continued monitoring.

Example 18 is an apparatus configured to be employed in a SON (Self Organizing Network) function, comprising: a memory interface; and processing circuitry configured to: collect performance data for NSIs (Network Slice Instances) supporting one or more of eMBB (enhanced Mobile Broadband), URLLC (Ultra Reliable Low Latency Communications), or mMTC (massive Machine Type Communications); analyze the performance data in connection with historical performance data collected over at least one of days, weeks, or months, to determine traffic patterns for the NSIs; predict demand for each NSI of the NSIs for a given time and a given location based on the collected performance data; and adjust one or more resource allocation for the NSIs based on the collected performance data.

Example 19 comprises the subject matter of any variation of any of example(s) 18, wherein the processing circuitry is further configured to continue monitoring the performance data to validate the one or more actions.

Example 20 comprises the subject matter of any variation of any of example(s) 19, wherein the processing circuitry is further configured to perform one or more further actions based on the continued monitoring.

Example 21 comprises the subject matter of any variation of any of example(s) 18-20, wherein the performance data comprise one or more of: a performance measurement related to data volume, a number of registered UEs (User Equipments), or a number of PDU (Protocol Data Unit) sessions.

Example 22 comprises an apparatus comprising means for executing any of the described operations of examples 1-21.

Example 23 comprises a machine readable medium that stores instructions for execution by a processor to perform any of the described operations of examples 1-21.

Example 24 comprises an apparatus comprising: a memory interface; and processing circuitry configured to: perform any of the described operations of examples 1-21.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature can be combined with one or more other features of the other implementations as may be desired and advantageous for any given or particular application.

What is claimed is:

1. An apparatus configured to be employed in a SON (Self Organizing Network) function, comprising:
   a memory interface; and
   processing circuitry configured to:
      collect one or more performance measurements associated with at least one of a RAN (Radio Access Network) or CN (Core Network), wherein the one or more performance measurements are associated with NSIs (Network Slice Instances) supporting one or more of eMBB (enhanced Mobile Broadband), URLLC (Ultra Reliable Low Latency Communications), or mMTC (massive Machine Type Communications);
      analyze the one or more performance measurements;
      generate one or more actions to control the behavior of at least one of the RAN or the CN, based on the analyzing of the one or more performance measurements;
      predict an associated demand for each NSI of the NSIs for a given time and a given location, based on the analyzing of the one or more performance measurements; and
      adjust a resource allocation for each NSI of the NSIs for the given time and the given location, based on the associated demand predicted for each NSI of the NSIs for the given time and the given location.

2. The apparatus of claim 1, wherein the one or more performance measurements are associated with DL (Downlink) beams and UL (Uplink) beams of two or more neighboring NR (New Radio) cells of the RAN.

3. The apparatus of claim 2, wherein the processing circuitry is configured to optimize at least one of a coverage or a capacity of the DL beams and the UL beams, based on the analyzing of the one or more performance measurements.

4. The apparatus of claim 2, wherein the one or more performance measurements comprise at least one of Reference Signal (RS) Received Power (RSRP) measurements, RS Received Quality (RSRQ) measurements, or Signal-to-Interference-plus-Noise Ratio (SINR) measurements.

5. The apparatus of claim 2, wherein the processing circuitry is further configured to:
   identify an area associated with the two or more neighboring NR cells that has poor coverage of at least one of the DL beams or the UL beams, based on the analyzing of the one or more performance measurements; and
   determine one or more actions to improve the poor coverage of the area.

6. The apparatus of claim 1, wherein the processing circuitry is configured to optimize resources of the NSIs supporting one or more of eMBB, URLLC, or mMTC.

7. The apparatus of claim 1, wherein the one or more performance measurements comprise one or more of: a performance measurement related to data volume, a number of registered UEs (User Equipments), or a number of PDU (Protocol Data Unit) sessions.

8. The apparatus of claim 1, wherein the one or more performance measurements comprise measurements collected over one or more of days, weeks, months, or years.

9. The apparatus of claim 1, wherein the processing circuitry is further configured to continue monitoring the one or more performance measurements to validate the one or more actions.

10. The apparatus of claim 9, wherein the processing circuitry is further configured to perform one or more further actions based on the continued monitoring.

11. An apparatus configured to be employed in a SON (Self Organizing Network) function, comprising:
a memory interface; and
processing circuitry configured to:
collect performance measurements for DL (Downlink) beams and UL (Uplink) beams in a set of NR cells, wherein the performance measurements are associated with NSIs (Network Slice Instances) supporting one or more of eMBB (enhanced Mobile Broadband), URLLC (Ultra Reliable Low Latency Communications), or mMTC (massive Machine Type Communications);
analyze the performance measurements of the DL beams and the UL beams in two or more neighboring cells of the set of NR cells;
identify an area associated with the two or more neighboring cells that has poor coverage of at least one of the DL beams or the UL beams, based on the analyzing of the performance measurements;
determine one or more actions to improve the poor coverage;
perform the one or more actions to improve the coverage;
predict an associated demand for each NSI of the NSIs for a given time and a given location, based on the analyzing of the performance measurements; and
adjust a resource allocation for each NSI of the NSIs for the given time and the given location, based on the associated demand predicted for each NSI of the NSIs for the given time and the given location.

12. The apparatus of claim 11, wherein the performance measurements comprise one or more of Reference Signal (RS) Received Power (RSRP) measurements, RS Received Quality (RSRQ) measurements, or Signal-to-Interference-plus-Noise Ratio (SINR) measurements.

13. The apparatus of claim 11, wherein the one or more actions comprise requesting one or more gNBs (next generation Node Bs) to change coverage of at least one of the DL beams or the UL beams in the two or more neighboring cells.

14. The apparatus of claim 13, wherein the processing circuitry is further configured to continue monitoring the performance measurements to validate the one or more actions.

15. The apparatus of claim 14, wherein the processing circuitry is further configured to perform one or more further actions based on the continued monitoring.

16. An apparatus configured to be employed in a SON (Self Organizing Network) function, comprising:
a memory interface; and
processing circuitry configured to:
collect performance data for NSIs (Network Slice Instances) supporting one or more of eMBB (enhanced Mobile Broadband), URLLC (Ultra Reliable Low Latency Communications), or mMTC (massive Machine Type Communications);
analyze the performance data in connection with historical performance data collected over at least one of days, weeks, or months, to determine traffic patterns for the NSIs;
predict demand for each NSI of the NSIs for a given time and a given location based on the collected performance data; and
adjust one or more resource allocation for the NSIs based on the collected performance data.

17. The apparatus of claim 16, wherein the processing circuitry is further configured to continue monitoring the collected performance data to validate one or more actions.

18. The apparatus of claim 17, wherein the processing circuitry is further configured to perform one or more further actions based on the continued monitoring.

19. The apparatus of claim 16, wherein the performance data comprise one or more of: a performance measurement related to data volume, a number of registered UEs (User Equipments), or a number of PDU (Protocol Data Unit) sessions.

* * * * *